UNITED STATES PATENT OFFICE.

WILHELM WEBER, OF STOLBERG II, GERMANY, ASSIGNOR TO CHEMISCHE FABRIK RHENANIA, OF AACHEN, GERMANY.

PROCESS OF OBTAINING A PREPARATION OF THE PANCREAS.

SPECIFICATION forming part of Letters Patent No. 685,543, dated October 29, 1901.

Application filed May 27, 1901. Serial No. 62,138. (No specimens.)

*To all whom it may concern:*

Be it known that I, WILHELM WEBER, a citizen of Germany, residing at Stolberg II, Rheinland, in the Empire of Germany, have invented a certain new and useful Process of Obtaining a Preparation of the Pancreas, of which the following is a specification.

It is known that tannin produces a precipitate in pancreatic juice; but this is a property common to all proteids; and hitherto there has been no means for obtaining an active pancreas preparation by means of tannin. On the contrary, it has always been stated that tannin renders all enzymes inactive.

By my invention a preparation is obtained from the pancreas by means of tannin which contains the enzymes of that organ and can resist the action of acids and gastric juice, but is soluble in alkaline liquids, whereupon the enzymes can exercise their digestive function. For this purpose pancreatin moistened with water or finely-comminuted fresh pancreas is stirred with a solution of tannin and the mixture is dried for use.

For example, one hundred grams of pancreatin are moistened with forty to fifty grams of water and stirred with a solution of twenty to twenty-five grams of tannin. The mixture is then carefully dried.

Having thus described the nature of my said invention and the best means I know of carrying the same into practical effect, I claim—

A process for obtaining a preparation of pancreas, capable of resisting gastric juice, consisting in stirring finely-comminuted fresh or dried pancreas substance with a solution of tannin, and then drying the mixture.

In testimony whereof I have hereunto set my hand in presence of two subscribing witnesses.

WILHELM WEBER.

Witnesses:
C. E. BRUNDAGE,
FRITZ STOLLEWERK.